(No Model.)
G. C. HEMENWAY.
SNELL AND GANGE FOR FISHING PURPOSES.
No. 469,016. Patented Feb. 16, 1892.
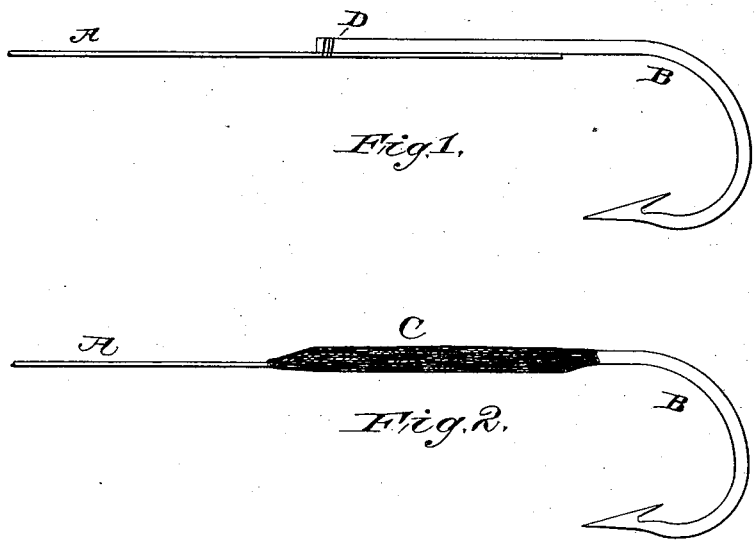

UNITED STATES PATENT OFFICE.

GEORGE C. HEMENWAY, OF NEW YORK, N. Y., ASSIGNOR OF ONE-HALF TO CHARLES F. IMBRIE, OF SAME PLACE.

SNELL AND GANGE FOR FISHING PURPOSES.

SPECIFICATION forming part of Letters Patent No. 469,016, dated February 16, 1892.

Application filed August 28, 1891. Serial No. 404,025. (No model.)

*To all whom it may concern:*

Be it known that I, GEORGE COWLES HEMENWAY, a citizen of the United States, and a resident of the city of New York, in the county and State of New York, have invented a new and useful Improvement in Snells and Ganges for Fishing Purposes, of which the following is a specification.

My invention relates to the art of attaching silk-worm gut or its equivalent to fish-hooks for angling purposes.

Heretofore in the making of snells, ganges, and other such fishing appliances the hooks have been united to the gut or its equivalent by wrapping them together with waxed thread, sometimes varnishing the wrapping as an additional security. Unless this is carefully done the hook is apt at a critical moment to draw out of the wrapping to the loss of both hook and fish. The same result may follow from the rotting of the thread or from the use of imperfectly waxed thread, or from the thread becoming unfastened at the end. My invention is intended to meet all these difficulties.

In the drawings forming part of this specification, Figure 1 shows a length of gut or its equivalent applied to a fish-hook ready to be united by my process. Fig. 2 shows the same with the said process complete.

Having placed a length of gut or its equivalent A in the position shown with reference to a fish-hook B and retaining them in that position, I apply to the place of contact a tough water-proof cement which has such affinity for both the hook and the gut or its equivalent as to fasten them securely together when the cement is dry. For this purpose I have used a cement consisting of ordinary sheet-celluloid dissolved in ether to the consistency of a sirup. I generally apply a second coat after the first is dry, and find that after weeks of soaking in water the bond between the gut and the hook is stronger than the gut itself. In but one way can the gut be detached from the hook by a pull, and that is by doubling the free end of the gut back upon the shank of the hook and stripping it down. Though it is difficult to see how such a strain can occur in fishing, to render assurance doubly sure a few turns of silk may be taken around the gut or its equivalent and the hook at the point D, Fig. 1, before the cement is applied.

I do not restrict myself to the above-described cement, though it is the best known to me. Any water-proof cement which will firmly unite the gut or its equivalent to the hook will answer the purpose.

Having thus described my invention, what I claim as new, and desire to patent, is—

1. As a new article of manufacture, a combined snell or gange and fish-hook, the gange being laid upon the fish-hook and secured thereto by a tough water-proof cement.

2. As a new article of manufacture, a combined snell or gange and fish-hook, the gange being laid upon the fish-hook and secured thereto by a tough water-proof cement, and a wrapping of thread at the upper end of the hook to prevent accidental stripping of the hook from the gange, substantially as set forth.

In testimony that I claim the foregoing as my invention I have signed my name, in presence of two witnesses, this 24th day of August, 1891.

G. C. HEMENWAY.

Witnesses:
 HENRY P. WELLS,
 WILLIAM KING.